W. A. CALDECOTT.
MEANS FOR SEPARATING LIQUIDS FROM CRUSHED ORE PRODUCTS.
APPLICATION FILED SEPT. 12, 1908.

1,008,524.

Patented Nov. 14, 1911.

2 SHEETS—SHEET 1.

Witnesses:
Chas Ovendale
R Ovendale

Inventor:
William Arthur Caldecott

W. A. CALDECOTT.
MEANS FOR SEPARATING LIQUIDS FROM CRUSHED ORE PRODUCTS.
APPLICATION FILED SEPT. 12, 1908.

1,008,524.

Patented Nov. 14, 1911.

2 SHEETS—SHEET 2.

Witnesses:
Chas. Ovendale
R. Ovendale

Inventor:
William Arthur Caldecott

UNITED STATES PATENT OFFICE.

WILLIAM ARTHUR CALDECOTT, OF JOHANNESBURG, TRANSVAAL.

MEANS FOR SEPARATING LIQUIDS FROM CRUSHED-ORE PRODUCTS.

1,008,524.  Specification of Letters Patent.  Patented Nov. 14, 1911.

Application filed September 12, 1908. Serial No. 452,751.

*To all whom it may concern:*

Be it known that I, WILLIAM ARTHUR CALDECOTT, a subject of the King of Great Britain, and resident of Johannesburg, Transvaal, have invented certain new and useful Means for Separating Liquids from Crushed-Ore Products, of which the following is a specification.

This invention relates to means for separating liquid, such as water, cyanid or other solvent solution or wash water, from crushed ore products.

The invention is applicable for use in the treatment of either class of such products—sands or slimes—and for either intermittent or continuous operation. With the means at present in use for separating liquid from such products, holes or passages form through the mass of solids in the separating vessel resulting in sudden rushes of the liquid through the aperture in the bottom of the vessel.

Now the object of the invention is to obviate this and to secure a constant thick underflow from the vessel by preventing the formation of holes or passages through the settled mass.

The invention may be utilized in spitzkasten or similar conical classifiers, or in tanks, vats, or receptacles of other shape, employed for the treatment of crushed ore products.

To the attainment of the object of the invention I employ a barrier which may take the form of a serrated or notched or perforated diaphragm or a serrated or notched and perforated diaphragm or two or more of such diaphragms which are positioned inside the vessel below the normal level of the mass of settled material.

The practical application of my invention is illustrated in and will be further described in connection with the accompanying two sheets of drawings, in which—

Figure 1:
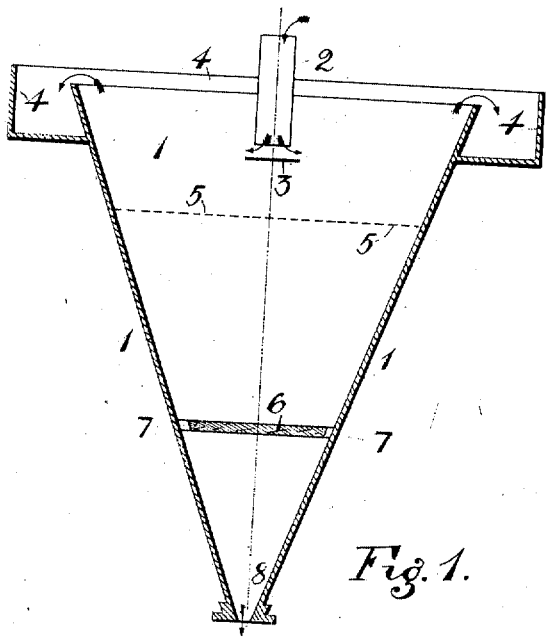
Figure 2:
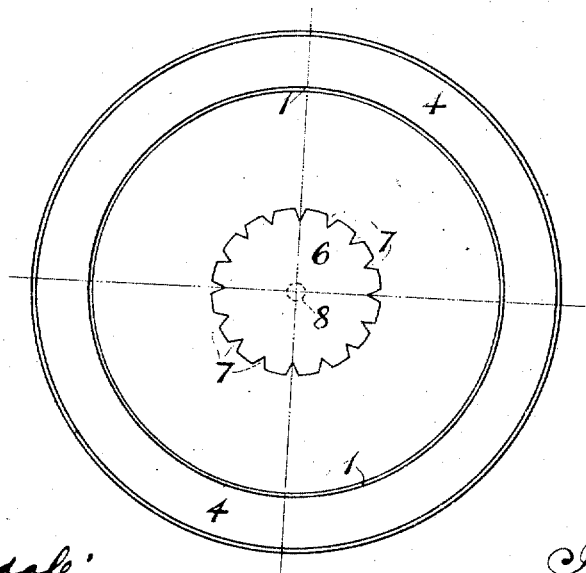
Figure 3:
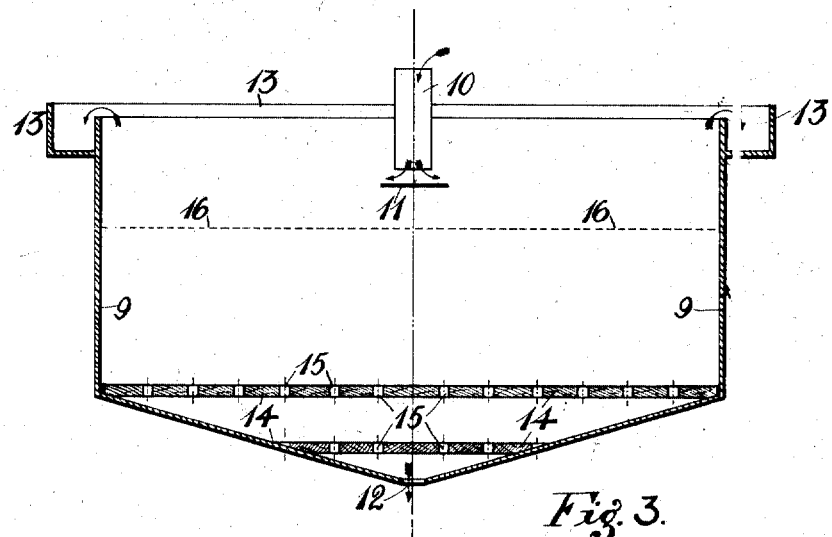
Figure 4:
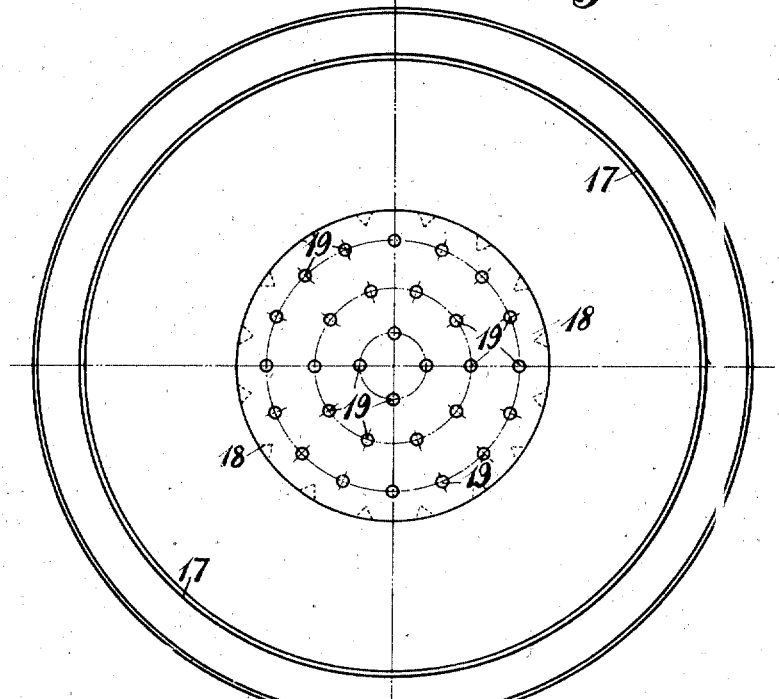

Figure 1 illustrates in sectional elevation, the invention adapted to an ordinary conical classifier or inverted conical vessel commonly employed in the treatment of auriferous ores for removing the bulk of liquid from a mixture of liquid and crushed ore products. Fig. 2 is a plan of Fig. 1. Fig. 3 is the adaptation of the invention to another common type of tank or vat, and Fig. 4 is a plan of a tank as shown in Fig. 3 illustrating the employment of one perforated diaphragm.

Referring more particularly to the arrangement illustrated in Figs. 1 and 2, 1 represents an inverted conical vessel into the upper end of which the mixture of crushed ore products and liquid is introduced through the medium of the vertical inlet pipe 2 which may, as is usual, be arranged to discharge the mixture onto or above a baffle plate 3 in order the more effectually to distribute the mixture within the vessel. The vessel 1 will ordinarily be provided with the usual rim launder 4 surrounding its upper edge to receive the overflow. The vessel 1 is also at its truncated lower end equipped with any suitable means for withdrawing the settled solids. The dotted line 5 in Fig. 1 represents the normal level of the settled solids.

At a suitable point or points below the normal level 5 I arrange one or more of the diaphragms 6. As illustrated in these figures it takes the form of a circumferentially serrated or notched disk. The peripheral indentations or serrations 7 provide or constitute the passages through which the settled solids pass on their way to the outlet 8 at the bottom of the vessel. Instead of employing one serrated diaphragm 6 as shown a plurality may be employed and if desired instead of or in addition to serrating the diaphragm or diaphragms circumferentially it or they may also be perforated preferably at or in proximity to the periphery.

In Fig. 3 I illustrate the application of the invention to that form of tank 9 which is made cylindrical for the greater portion of its height and of inverted conical form in its lower portion. In this case the pulp or mixture of liquid and crushed ore products may be introduced into the vessel by means of the inlet pipe 10 and distributing baffle 11, the settled solids be withdrawn through the discharge aperture 12 in the bottom of the vessel 9 and the overflow be received by the annular rim launder 13. In this figure the vessel is shown provided with two perforated diaphragms 14 the perforations or apertures 15 in this case constituting the passages through which the settled solids pass to the outlet 12. The diaphragms 14 are arranged a suitable distance apart, one above the other, and at some depth below the normal level, indicated by the dotted line 16, of the settled solids. In this type the diaphragm or diaphragms may also be circumferentially notched as shown in dotted lines in Fig. 4.

In Fig. 4 a vessel 17 of the configuration shown in Fig. 3 is illustrated provided with one of the perforated diaphragms 18. For the type of vessel illustrated more particularly in Figs. 3 and 4 the apertures or perforations 15, 19 formed in the diaphragm or diaphragms 12, 18, are preferably uniformly distributed over the whole area thereof so that each of said perforations or apertures serves a more or less equal area.

The diaphragms may be made of wood or sheet metal or any other suitable material and they may be supported inside the vessel as shown or in any other convenient manner.

In operation, the ore pulp is delivered through the vertical inflow pipe over the horizontal baffle slightly below the surface of the pulp in the center of the tank which is kept nearly filled to the top with sand. The diaphragm, by supporting a considerable depth of settled sand, prevents any change in consistency or breaking away of the thick sluggish underflow while the large size openings at the bottom of the tank preclude choking. Large quantities of pulp containing very little moisture can thus be delivered with a steady flow.

What I claim as my invention and desire to protect by Letters Patent is:—

1. In a separator for liquids and crushed ore products, a vessel for receiving the mixture of solids and liquids, said vessel having an outlet adapted to discharge the settled products, and a barrier in said vessel arranged below the level of the settled products and adapted to prevent the formation of passages through said settled products while permitting the passage of said products to said outlet.

2. In a separator for liquids and crushed ore products, a vessel for receiving the mixture of solids and liquids, said vessel having an outlet adapted to discharge the settled products, and a barrier in said vessel arranged below the level of the settled products and adapted to prevent the formation of passages through said settled products, said barrier having apertures to permit the passage of said products to said outlet.

3. In a separator for liquids and crushed ore products, a vessel for receiving the mixture of solids and liquids, said vessel having an outlet adapted to discharge the settled products, and a barrier in said vessel arranged below the level of the settled products and adapted to prevent the formation of passages through said settled products, said barrier having passages between it and the walls of the tank to permit the passage of said products to said outlet.

4. In a separator for liquids and crushed ore products, a vessel for receiving the mixture of solids and liquids, said vessel having an outlet adapted to discharge the settled products, and a barrier in said vessel arranged below the level of the settled products and adapted to prevent the formation of passages through said settled products, said barrier having passages between it and the walls of the tank and openings through it to permit the passage of said products to said outlet.

In testimony whereof I have signed my name to this specification in the presence of two subscribing witnesses.

WILLIAM ARTHUR CALDECOTT.

Witnesses:
 CHAS. OVENDALE,
 R. OVENDALE.